(No Model.)

A. B. DISS.
FURNITURE CASTER.

No. 324,820. Patented Aug. 25, 1885.

WITNESSES
Gunvald Aas.
Abraham L. Jacobs

INVENTOR
Albert B. Diss.
By James A. Whitney
Attorney

UNITED STATES PATENT OFFICE.

ALBERT B. DISS, OF BROOKLYN, NEW YORK.

FURNITURE-CASTER.

SPECIFICATION forming part of Letters Patent No. 324,820, dated August 25, 1885.

Application filed December 27, 1884. (No model.)

*To all whom it may concern:*

Be it known that I, ALBERT B. DISS, of Brooklyn, in the county of Kings and State of New York, have invented an Improvement in Furniture-Casters, of which the following is a specification.

The furniture-caster in common use is composed of a cast-metal frame integral with the pintle, and having the wheel or roller journaled between the two side portions of said frame. This construction is expensive, and the parts in which the wheel or roller is axled as aforesaid are necessarily fragile and liable to fracture, which practically destroys the entire device.

The object of my invention is to provide a caster which may be more cheaply manufactured in large quantities than the common caster aforesaid, and which will be able to bear many fold the strain, jar, and concussion to which said common casters may be subjected with safety. My invention comprises a furniture-caster having its frame composed of wrought metal, and provided with two parts, which are bent in opposite directions in such a manner that they provide between them a socket for the reception of the pintle of the caster-wheel, whereby the objects and advantages desired, as aforesaid, are effectually secured.

Figure 1:
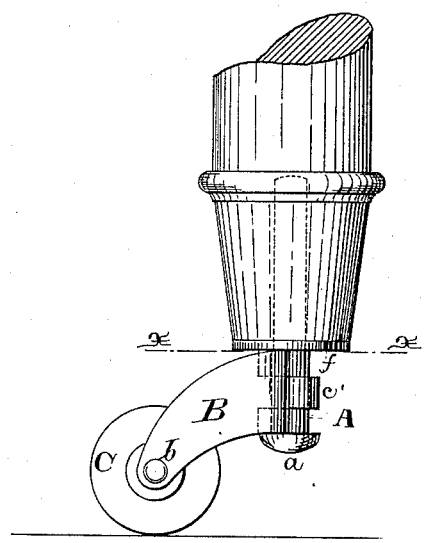
Figure 2:
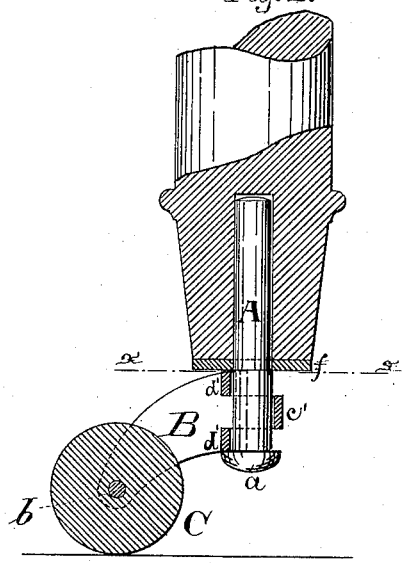
Figure 3:
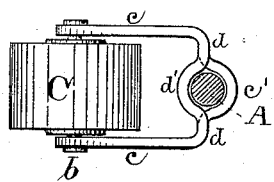
Figure 4:
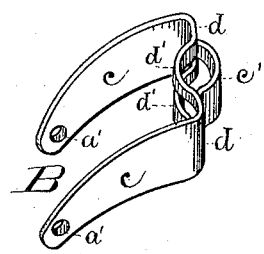

Figure 1 is a side view; Fig. 2, a partial sectional view, and Fig. 3 a horizontal sectional view, on the line $x\ x$ of Figs. 1 and 2, of a caster made according to my said invention as applied to use, and Fig. 4 is a perspective view of one part of said caster.

A is the pintle of the caster. This may be of any suitable material, but is preferably of wrought-iron, and is preferably provided with a head, $a$, at its lower end.

B is that portion of the frame of the caster which receives the wheel or roller, C, and in which said roller is axled, as shown at $b$. This part B is made of wrought sheet metal bent to the requisite shape—that is to say, with the two substantially parallel side arms, $c$, with the bearings $a'$ for the journal or axle $b$ of the wheel or roller C, and with the back $d$, integral with said arms $c$, and the said back $d$ slitted transversely so that one portion, $c'$, may be bent outward in semicircular form, while another portion or portions, $d'$, may be bent in a similar manner in an opposite direction, so that the pintle A, being thrust upward or inward between the said portions $c'\ d'$, the said portions may be firmly affixed to the lower end of the pintle by compression or otherwise, as indicated in Figs. 1 to 3, inclusive, the part B and the pintle A together constituting the frame, and this latter, with the wheel or roller C, forming the caster complete. When in actual use, the pintle is inserted in a suitable socket in the furniture-leg in the usual or in any appropriate manner, as shown in Figs. 1 and 2. When desired, the portion $c'$ may be bent inward instead of outward, and, correspondingly, the portions $d'$ outward instead of inward. By increasing the number of slits in the back $d$ a greater number of the portions $c'$ and $d'$ may be provided and employed.

It is to be observed that while the part B may be fast upon the pintle, as just mentioned, the preferred construction is to have the said part B actually loose on said pintle, so as to turn thereon, the arbor in such case being driven fast and fixed in the furniture-leg. A collar or washer, $f$, may, when desired, be interposed between the part B and the contiguous lower end of the furniture-leg to which the apparatus is applied.

What I claim as my invention is—

In a furniture caster, the frame composed of the wrought metal part B, having integral portions $c'\ d'$, bent in opposite directions, to form a socket for the reception of a pintle, A, substantially as and for the purpose herein set forth.

ALBERT B. DISS.

Witnesses:
GUNVALD AAS,
JAMES A. WHITNEY.